United States Patent
Shakal et al.

(10) Patent No.: US 7,364,683 B2
(45) Date of Patent: Apr. 29, 2008

(54) ROTARY AUTOMATIC TRANSFER RAIL FOR INJECTION MOLDING

(75) Inventors: Wayne A. Shakal, Taylors Falls, MN (US); Thomas J. Walsh, Hudson, WI (US)

(73) Assignee: Advance Tool, Inc., Blaine, MN (US)

( * ) Notice: Subject to any disclaimer, the term of this patent is extended or adjusted under 35 U.S.C. 154(b) by 46 days.

(21) Appl. No.: 11/329,548

(22) Filed: Jan. 11, 2006

(65) Prior Publication Data

US 2006/0153947 A1 Jul. 13, 2006

Related U.S. Application Data

(60) Provisional application No. 60/643,043, filed on Jan. 11, 2005.

(51) Int. Cl.
*B29C 45/17* (2006.01)
(52) U.S. Cl. .............. 264/237; 264/259; 264/297.2; 264/334; 425/125; 425/126.1; 425/552; 425/556; 425/575; 425/444
(58) Field of Classification Search ............... 425/112, 425/125, 126.1, 552, 556, 575, 588, 444; 264/259, 271.1, 297.2, 334, 328.8, 237
See application file for complete search history.

(56) References Cited

U.S. PATENT DOCUMENTS

| | | | | |
|---|---|---|---|---|
| 3,259,356 A | 7/1966 | Hehl | ............ | 249/161 |
| 3,482,284 A | 12/1969 | Rees | ............ | 18/30 |
| 3,702,750 A | 11/1972 | Veneria | ............ | 425/130 |
| 3,788,794 A | 1/1974 | Hehl | ............ | 425/450 |
| 4,165,959 A | 8/1979 | Dechavanne | ............ | 425/130 |
| 4,204,824 A * | 5/1980 | Paradis | ............ | 425/444 |
| 4,243,362 A | 1/1981 | Rees | ............ | 425/130 |
| 4,243,364 A * | 1/1981 | Rees et al. | ............ | 425/444 |
| 4,330,257 A | 5/1982 | Rees | ............ | 425/556 |
| 4,422,995 A | 12/1983 | Schad | ............ | 264/250 |
| 4,444,711 A | 4/1984 | Schad | ............ | 264/243 |
| 4,734,023 A | 3/1988 | Nesch | ............ | 425/130 |
| 4,915,611 A * | 4/1990 | Brown | ............ | 425/588 |
| 5,037,597 A * | 8/1991 | McGinley et al. | ............ | 425/588 |
| 5,052,915 A | 10/1991 | Schad | ............ | 425/556 |
| 5,112,558 A * | 5/1992 | Schad et al. | ............ | 425/588 |
| 5,378,141 A | 1/1995 | Aoki | ............ | 425/589 |
| 5,435,715 A | 7/1995 | Campbell | ............ | 425/576 |
| 5,804,224 A | 9/1998 | Inaba | ............ | 425/150 |
| 5,837,301 A | 11/1998 | Arnott | ............ | 425/574 |
| 5,914,139 A | 6/1999 | Matsubayashi | ............ | 425/145 |
| 5,975,872 A | 11/1999 | Raines | ............ | 425/136 |
| 6,139,305 A | 10/2000 | Nesch | ............ | 425/130 |

(Continued)

*Primary Examiner*—James Mackey
(74) *Attorney, Agent, or Firm*—Fredrikson & Byron, P.A.

(57) ABSTRACT

Methods and assemblies related to a rotary automatic transfer rail for injection molding are disclosed. In one aspect, the invention includes a mold assembly. The mold assembly may include first, second, and third mold plates. The mold plates may be positioned generally parallel to one another. The mold assembly may include an automatic transfer rail assembly. The automatic transfer rail assembly may include a rail. The automatic transfer rail assembly may include a carrier. The carrier may have first and second members. The carrier may be translatable along the rail between a first closed position and an open position. The carrier may be rotatable about the rail. In some embodiments, molded articles need not be transferred from mold components to a robot and then back to different mold components.

18 Claims, 12 Drawing Sheets

U.S. PATENT DOCUMENTS

| | | | |
|---|---|---|---|
| 6,368,095 B1 | 4/2002 | Chang | 425/145 |
| 6,439,875 B1 | 8/2002 | Morita | 425/556 |
| 6,478,571 B1 | 11/2002 | Tsai | 425/556 |
| 6,516,866 B1 * | 2/2003 | Jones | 425/588 |
| 6,561,785 B1 | 5/2003 | Morita | 425/150 |
| 6,709,251 B2 | 3/2004 | Payette | 425/112 |
| 6,783,346 B2 | 8/2004 | Bodmer | 425/112 |
| 6,790,027 B1 | 9/2004 | Callen | 425/556 |
| 6,821,100 B2 | 11/2004 | Kroeger | 425/112 |

* cited by examiner

ROTARY AUTOMATIC TRANSFER RAIL FOR INJECTION MOLDING

CROSS-REFERENCE TO RELATED APPLICATION

This application claims priority under 35 U.S.C. § 119(e) to U.S. provisional application 60/643,043, filed Jan. 11, 2005, which is hereby incorporated by reference in relevant part.

TECHNICAL FIELD

This document relates to a variety of applications involving injection molding.

BACKGROUND

Injection molding is a critically important process for manufacturing plastic parts. Manufacturers may produce large quantities of articles having complex geometries in a single production step. In many instances, finishing operations may not be necessary.

In injection molding, molten plastic may be injected at high pressure into a mold, which may be the inverse of the desired shape of the article to be molded. The mold may be made by a mold maker (or toolmaker) from metal (e.g., steel or aluminum) and precision-machined to form the features of the desired part. The plastic may cool until hardened, thereby resulting in the desired molded article.

Articles produced by injection molding pervade modern life. Examples include automotive parts, appliances, toys, components used in medical devices, consumer electronic goods, household goods, and communication and industrial equipment.

Some injection molding applications may employ multiple processing stations. Examples of such applications include in-mold assembly operations, insert loading, overmolding, providing additional cooling time for certain articles, in-mold decorating, in-mold labeling, and in-mold assembly stations. Increasing its speed and/or accuracy associated with such applications may provide substantial benefits.

SUMMARY

In one aspect, the invention includes a mold assembly. The mold assembly may include first, second, and third mold plates. The mold plates may be positioned generally parallel to one another. At least one of the mold plates may have a sprue hole. The mold assembly may include an automatic transfer rail assembly, which may be coupled to one of the mold plates. The automatic transfer rail assembly may include a rail, which may extend generally parallel to the first, second, and third mold plates. The automatic transfer rail assembly may include a carrier, which may be coupled to the rail. The carrier may have first and second members. The carrier may be translatable along the rail between a first closed position and an open position. In the first closed position, the first member may be positioned functionally between the first mold plate and the second mold plate. In the first closed position, the second member may be positioned functionally between the second mold plate and the third mold plate. In the open position, the first and second members may be outside of the first, second, and third mold plates.

In some embodiments, the mold assembly's carrier may be rotatable about the rail. The carrier may be rotatable to the first closed position and to a second closed position. In the second closed position, the first member may be positioned functionally between the second mold plate and the third mold plate. In the second closed position, the second member may be positioned functionally between the first mold plate and the second mold plate.

In a second aspect, the invention includes a method for injection molding an article. The method may include providing a mold assembly. The mold assembly may have first, second, and third mold plates, which may be positioned generally parallel to one another. At least one of the mold plates may have a sprue hole. The mold assembly may have an automatic transfer rail assembly, which may be coupled to one of the mold plates. The automatic transfer rail assembly may include a rail, which may extend generally parallel to the first, second, and third mold plates. The automatic transfer rail assembly may include a carrier, which may be coupled to the rail and may have first and second members. The method may include translating the carrier along the rail from a first open position to a first closed position. In the first open position, the first and second members may be outside of the mold plates. In the first closed position, the first member may be positioned functionally between the first and second mold plates. In the first closed position, the second member may be positioned functionally between the second and third mold plates. The method may include closing the mold assembly. The method may include performing a first injection molding operation at a first processing station between the first and second mold plates. The method may include opening the mold assembly. The method may include translating the carrier along the rail from the first closed position to the first open position.

In some embodiments, the method may include rotating the carrier about the rail from the first open position to a second open position. In the second open position, the carrier may be outside of the mold plates. The method may include translating the carrier along the rail from the second open position to a second closed position. In the second closed position, the first member may be positioned functionally between the second mold plate and the third mold plate. In the second closed position, the second member may be positioned functionally between the first and second mold plates. The method may include closing the mold assembly. The method may include performing the first injection molding operation at the first processing station. The method may include performing a second injection molding operation at a second processing station between the second and third mold plates. The method may include opening the mold assembly. The method may include translating the carrier along the rail from the second closed position to the second open position.

Certain embodiments may have one or more of the following advantages. In some embodiments, the time required to produce molded articles may be substantially decreased. In some embodiments, the number of molded articles produced in a given amount of time may be substantially increased. In some embodiments, insert loading may occur at one processing station while molding is occurring at another processing station. In some embodiments, molded articles need not be transferred from mold components to a robot and then back to different mold components. In such embodiments, mold components themselves may translate and/or rotate to remove molded articles from one set of molded components and to introduce the molded articles to a different set of mold components. In such embodiments, the time required for mold components to transfer the molded articles may provide for additional cooling. In some embodiments, molded articles may be cooling at one processing station while other articles are molded at another processing station.

DETAILED DESCRIPTION OF ILLUSTRATIVE EMBODIMENTS

Figure 1:
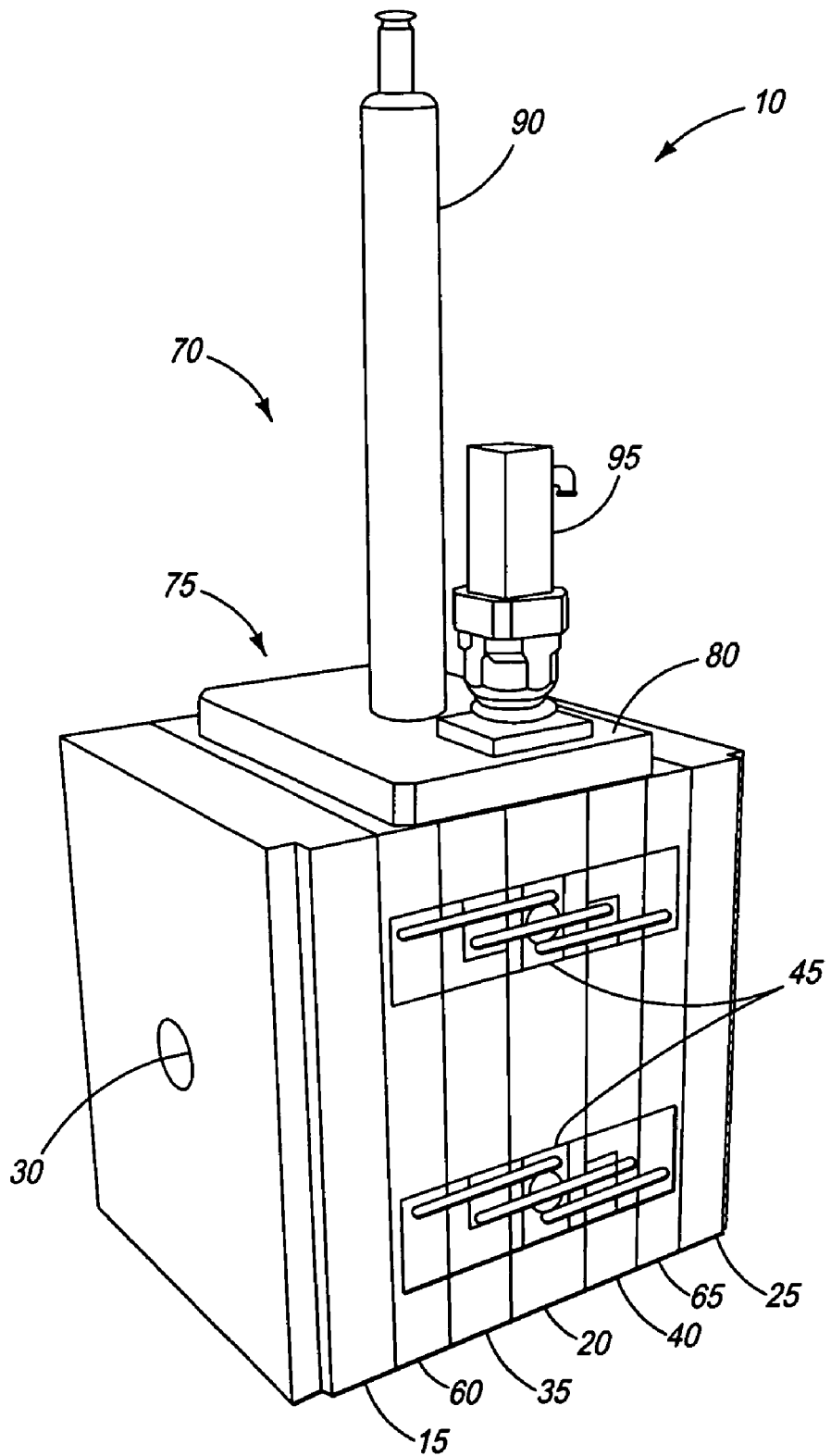
FIGS. 1-10 show perspective views of an exemplary mold assembly having an automatic transfer rail assembly.

The following detailed description of illustrative embodiments should be read with reference to the drawings, in which like elements in different drawings are numbered identically. The drawings depict illustrative embodiments and are not intended to limit the scope of the invention. Rather, the present invention is defined solely by the claims.

FIGS. 1-10 show an exemplary mold assembly 10. The mold assembly 10 may include three mold plates 15, 20, 25. Mold plate 15 may be connected to a stationary platen on an injection molding machine. Mold plate 25 may be connected to a movable platen on an injection molding machine. In some embodiments, mold plate 15 may be attached to the movable platen, and mold plate 25 may be attached to the stationary platen. Mold plate 15 may include a sprue hole 30 through which resin may flow during an injection molding operation. In some embodiments, mold plate 25 may include a sprue hole through which resin may flow during an injection molding operation.

The mold assembly 10 may include multiple mold components, which may be assist in molding a variety of articles. FIGS. 1-10 show a mold half 60 connected to mold plate 15 and a mold half 65 connected to mold plate 25. In some embodiments, the mold halves 60, 65, may be mold cores. In some embodiments, the mold halves 60, 65 may be mold cavities. In some embodiments, a mold half may be connected to each side of mold plate 20. In some embodiments, mold halves connected to mold plate 20 may cooperate with mold halves 60, 65 to form a mold to be used in injection molding applications. In some embodiments, other mold components may contribute, along with the mold halves 60, 65 connected to mold plates 15, 25 and/or mold halves connected to mold plate 20, to forming a mold to be used in injection molding applications. Such other mold components may include cores, core blocks, cavity blocks, slides, other mechanical actions, and other suitable mold components.

The mold assembly 10 may include an automatic transfer rail assembly ("ATR assembly") 70, which may include multiple components and may assist in molding a variety of articles. Such articles may include toothbrushes, syringe plungers, leurs, wye sites, PVC plumbing products, writing instruments, razor handles, kitchenware, silicone multi-shot, tubular silicone products, filtration, cutlery, and other similar articles. The ATR assembly 70 may include a carrier 75, which may, among other things, transport articles through various stages of molding.

The carrier 75 may include a base plate 80 to which other components of the ATR assembly 70 may be connected. The carrier 75 may include a plurality of mold members 85, 86, 87, 88. The mold members 85 86, 87, 88 may be coupled to the base plate 80 and may extend inwardly from the base plate 80 toward the mold. The mold members 85, 86, 87, 88 may be able to move relative to the base plate 80. The mold members 85 86, 87, 88 may be configured to fit between, on one hand, mold plate 15 and mold plate 20, and on the other hand, between the mold plate 20 and mold plate 25. In some embodiments, the mold members 85 86, 87, 88 may contribute, along with the mold halves 60, 65 connected to mold plates 15, 25 and/or mold halves connected to mold plate 20, to forming a mold to be used in injection molding applications. In some embodiments, the mold members 85 86, 87, 88 may hold mold components that may contribute, along with the mold halves 60, 65 connected to the mold plates 15, 20, 25 to forming a mold to be used in injection molding applications. Examples of such mold components include cores, core pins, strippers, slide mechanisms, and other suitable mold components. Cooling channels may be implemented with any of the mold components. In embodiments in which the mold members 85, 86, 87, 88, and/or mold components carried by the mold members 85, 86, 87, 88, contribute to forming a mold, the mold members 85, 86, 87, 88 and/or mold components may be made of steel. In some embodiments, the mold members 85 86, 87, 88 may serve to transport molded articles from one processing station to another. Examples of processing stations include molding stations, over-molding stations, cooling stations, insert loading stations, in-mold decorating stations, in-mold labeling stations, in-mold assembly stations, and other similar stations. Processing stations are discussed in greater detail below in connection with the functionality of a mold assembly having an ATR assembly.

The ATR assembly 70 may include a rail 90, which may connect on one end to the base plate 80 of the carrier 75 and on the other end to mold plate 20. The carrier 75 may be configured to translate along the rail 90 between an open position and a closed position. As shown in FIGS. 1-10, the open position is when the carrier 75 is in its uppermost position, and the closed position is when the carrier 75 is in the lowermost position. However, other configurations are possible. In some embodiments, the rail 90, may be oriented in ways other than shown in FIGS. 1-10. For example, in some embodiments, the rail 90 may be oriented generally horizontally. In such embodiments, the carrier 75 may be in an open position when outside of the mold plates 15, 20, 25 and in a closed position mold members 85, 86, 87, 88 are between the mold plates 15, 20, 25. The rail 90 may be oriented in any suitable orientation, as long as the carrier 75 is able to translate along the rail 90 to positions between an open position and closed position. In some embodiments, multiple rails may be provided for the same set of mold plates 15, 20, 25. In such embodiments, the multiple rails may allow one or more carriers to translate into and out of the mold from different angles. An example of such an embodiment may include two rails—one extending vertically upwardly from the mold and one extending vertically downwardly from the mold. In such example, a carrier may translate along each rail between open and closed positions. The mold members 85, 86, 87, 88 need not be completely between the mold plates 15, 20, 25 for the carrier 75 to be in the closed position. For example, in some embodiments, the mold members 85, 86, 87, 88 may be only partially between the mold plates 15, 20, 25. In such embodiments, the carrier 75 may be in a closed position if the mold members 85, 86, 87, 88 are functionally between the mold plates 15, 20, 25—that is, between the mold plates 15, 20, 25 to an extent sufficient to allow an injection molding operation to be performed. Several other configurations are possible.

The mold assembly 10 may allow the mold members 85, 86, 87, 88 to be pressed together with the mold plates 15, 20, 25 for an injection molding operation. The mold assembly may include guides 35, 40, which may be configured to receive the mold members 85, 86, 87, 88 as the carrier 75 is being moved into the closed position. The mold members 85, 86, 87, 88 may slide into grooves in the guides 35, 40. As the mold is closed (e.g., by the molding machine), a harmonic linkage 45 may ensure proper spacing of the guides 35, 40, and thus the mold members 85, 86, 87, 88, relative to the mold plates 15, 20, 25. The mold members 85, 86, 87, 88 may slide relative to the base plate 80. In this way, the mold members 85, 86, 87, 88 may be introduced to mold halves in the optimal way to prepare the mold assembly 10 for the injection molding operation.

The carrier 75 of the ATR assembly 70 may be configured to rotate about the rail 90. When the carrier 75 is in the open position—that is, outside of the mold plates 15, 20, 25—the carrier 75 may rotate about the rail 90 through any suitable angle, depending on the particular application. In the embodiment shown in FIGS. 1-10, the inner edges of the mold members 85, 86, 87, 88 may remain clear of the upper edges of the mold plates 15, 20, 25 during rotation. The same principles may apply when the rail 90 is oriented other than vertically. That is, in embodiments in which the rail 90 is oriented generally horizontally, the inner edges of the mold members 85, 86, 87, 88 may be configured to remain clear of the side edges of the mold plates 15, 20, 25. In some embodiments, the carrier 75 may translate along the rail 90 and rotate about the rail 90 at the same time. In such embodiments, the carrier 75 may be partially or completely rotated by the time the carrier 75 reaches the open position. In embodiments in which multiple rails are present, one carrier may be configured to translate along and/or rotate about one rail in the same and/or different manner that the other carrier(s) translate along and/or rotate about respective rail(s).

The ATR assembly 70 may include an actuator 95, which may, among other things, control the movement of the carrier 75. In some embodiments, the actuator 95 may be attached to the base plate 80. In such embodiments, the actuator 95 may translate and/or rotate along with the carrier 75. In some embodiments, the actuator 95 may be attached to mold plate 20. In such embodiments, the actuator 95 may not translate or rotate along with the carrier 75. In some embodiments, the actuator 95 may cause the carrier 75 to translate to various positions between the open and closed positions. In some embodiments, the actuator 95 may cause the carrier 75 to rotate about the rail 90 through a variety of angles. The actuator 95 may be a pneumatic cylinder, an electric servo motor, a hydraulic cylinder, or other suitable actuator. The actuator 95 may be controlled by any suitable controller. In some embodiments, the ATR assembly 70 may include a servo driven ball screw and ball spline combination, which may allow both translation and rotation of the carrier 75.

Many structural modifications to exemplary mold assembly 10 are possible. For example, in some ATR assemblies, a hub-and-spoke-type configuration may be provided in place of a base plate. In such embodiments, the rail may run through the hub while the spokes connect to the various mold members. In some ATR assemblies, the rail may not run through the center of the base plate, but rather may run alongside the base plate and may connect to the base plate via a connection mechanism. Such ATR assemblies may resemble a mobile.

Figure 2:
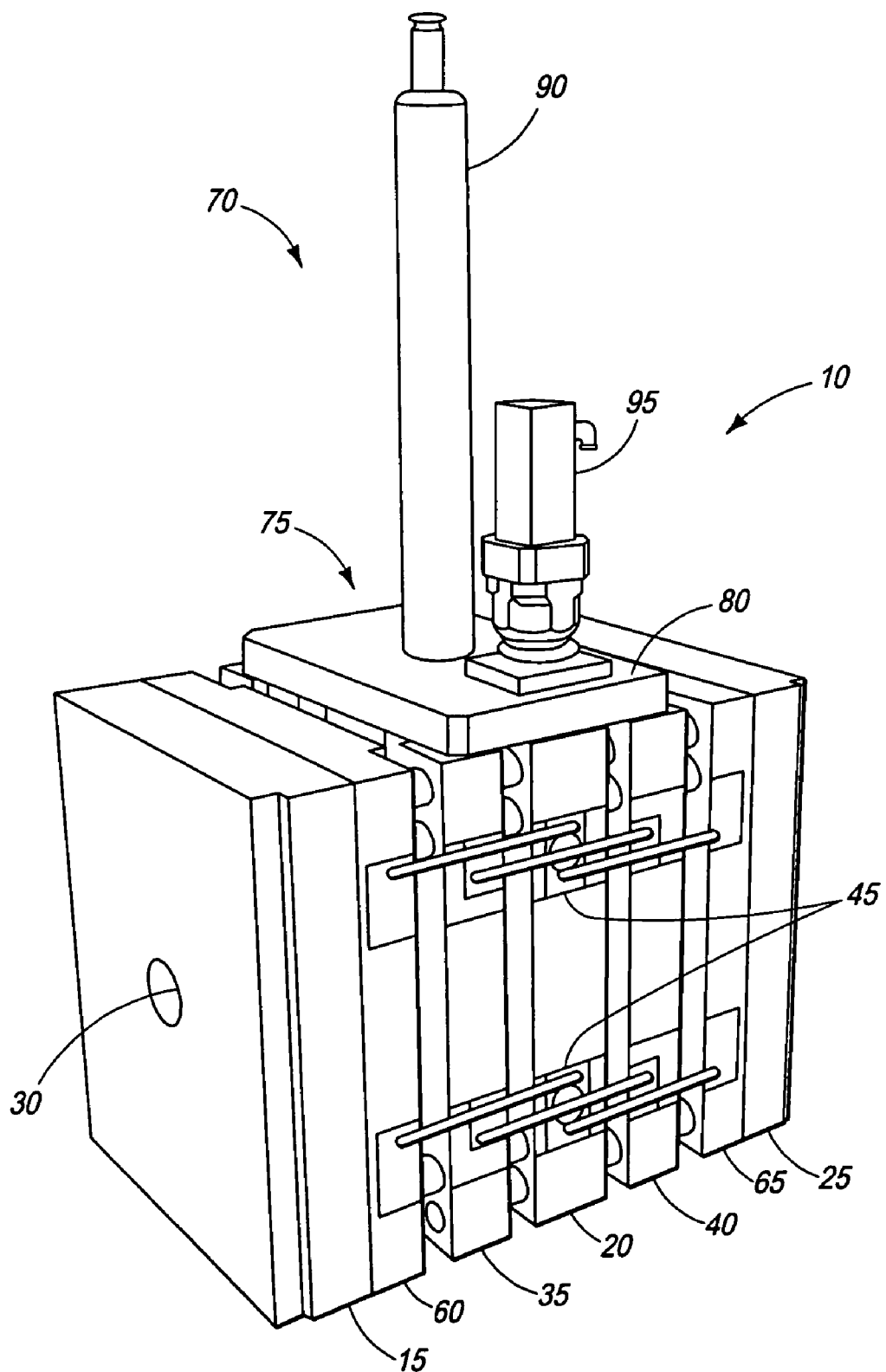
Figure 3:
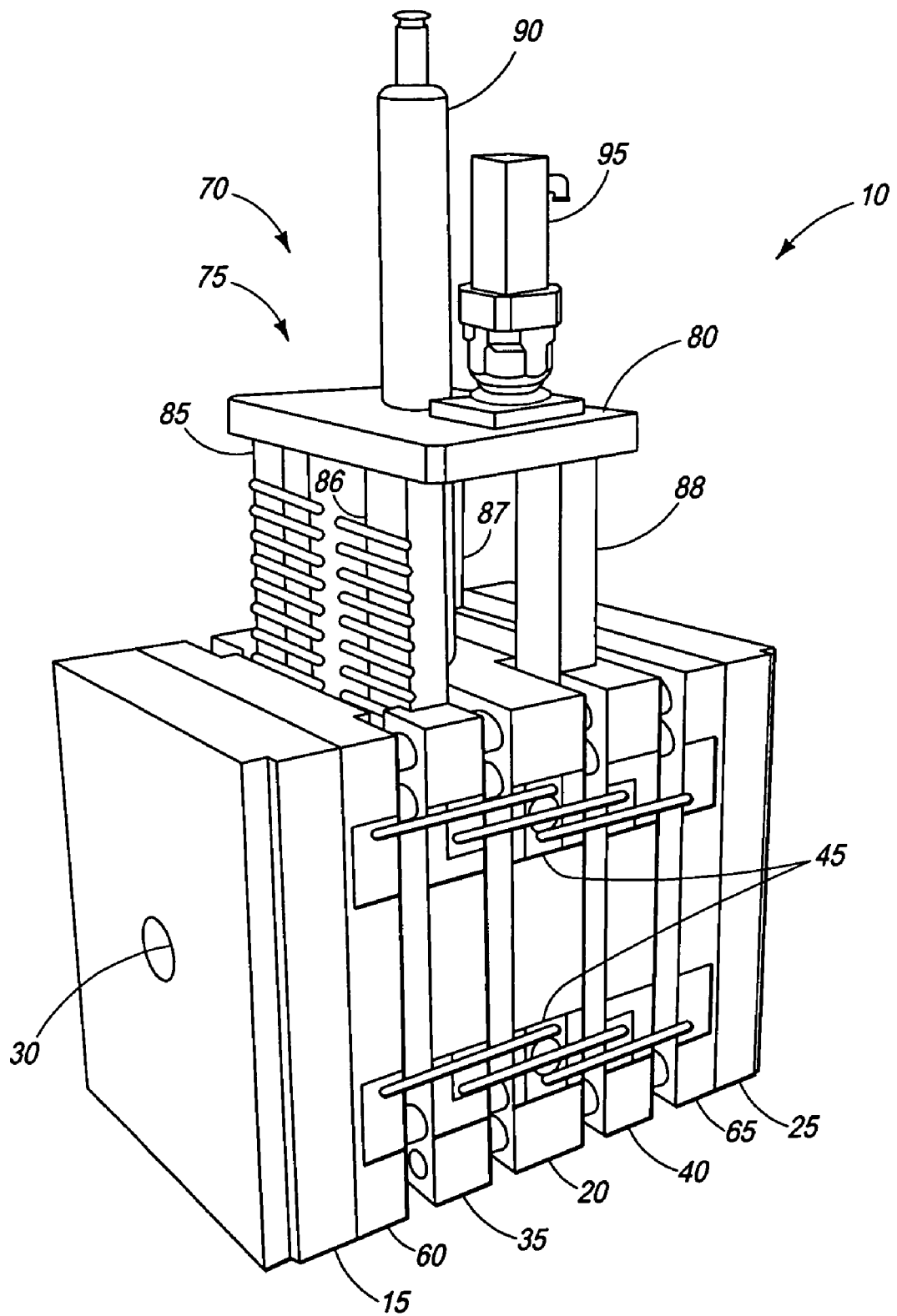

In use, the exemplary mold assembly 10 of FIGS. 1-10 may be able to mold a variety of articles with increased productivity and efficiency. FIGS. 1-10 show a sequence of the mold assembly 10 in use. That is, if FIG. 1 shows the mold assembly 10 at time 1, FIG. 2 shows the mold assembly 10 at time 2, FIG. 3 shows mold assembly 10 at time 3, and so on. Additional uses of mold assemblies having technology that is known or that is disclosed elsewhere herein are known by those skilled in the art.

FIG. 1 shows the mold assembly 10 during a first molding operation. The mold plates 15, 20, 25, various mold components, and the mold members 85, 86, 87, 88 may be pressed together to create one or more molds. As discussed elsewhere herein, the mold may be formed by (a) mold halves connected to the mold plates 15, 20, 25, (b) mold components comprised of and/or housed in the mold members 85, 86, 87, 88, (c) other suitable mold components, and (d) combinations thereof. For purposes of illustration, the processing station between mold plate 15 and mold plate 20 may be the first processing station, and the processing station between mold plate 20 and mold plate 25 may be the second processing station. In some embodiments, a series of molded articles may be molded at the first processing station. Resin may flow into the first processing station's mold via the sprue hole 30 during the molding operation, and one or more mold parameters (e.g., temperature, time, pressure) may be controlled to successfully mold the desired molded articles. The first processing station's mold may be cooled as long as necessary to allow to mold to open without damaging the any of the molded articles. In some embodiments, one or more inserts may be placed into the mold (e.g., by a robot) at the first processing station to be molded over at the second processing station. An insert may be any part that may be molded over.

FIG. 2 shows the mold assembly 10 just after the first molding operation has been completed. The mold may open. The harmonic linkage 45 and the guides 35, 40 may cause mold plates 20, 25 to move away from mold plate 15 in a way that the gap between mold plate 15 and mold plate 20 is the same as the gap between mold plate 20 and mold plate 25 and that the mold members 85, 86, 87, 88 are continually positioned midway between the respective mold plates. Mold components held by or comprised of the mold members 85, 86, 87, 88 may retain the relevant parts (e.g., freshly molded articles, inserts, etc.). The carrier 75 may remain in the closed position.

Figure 4:
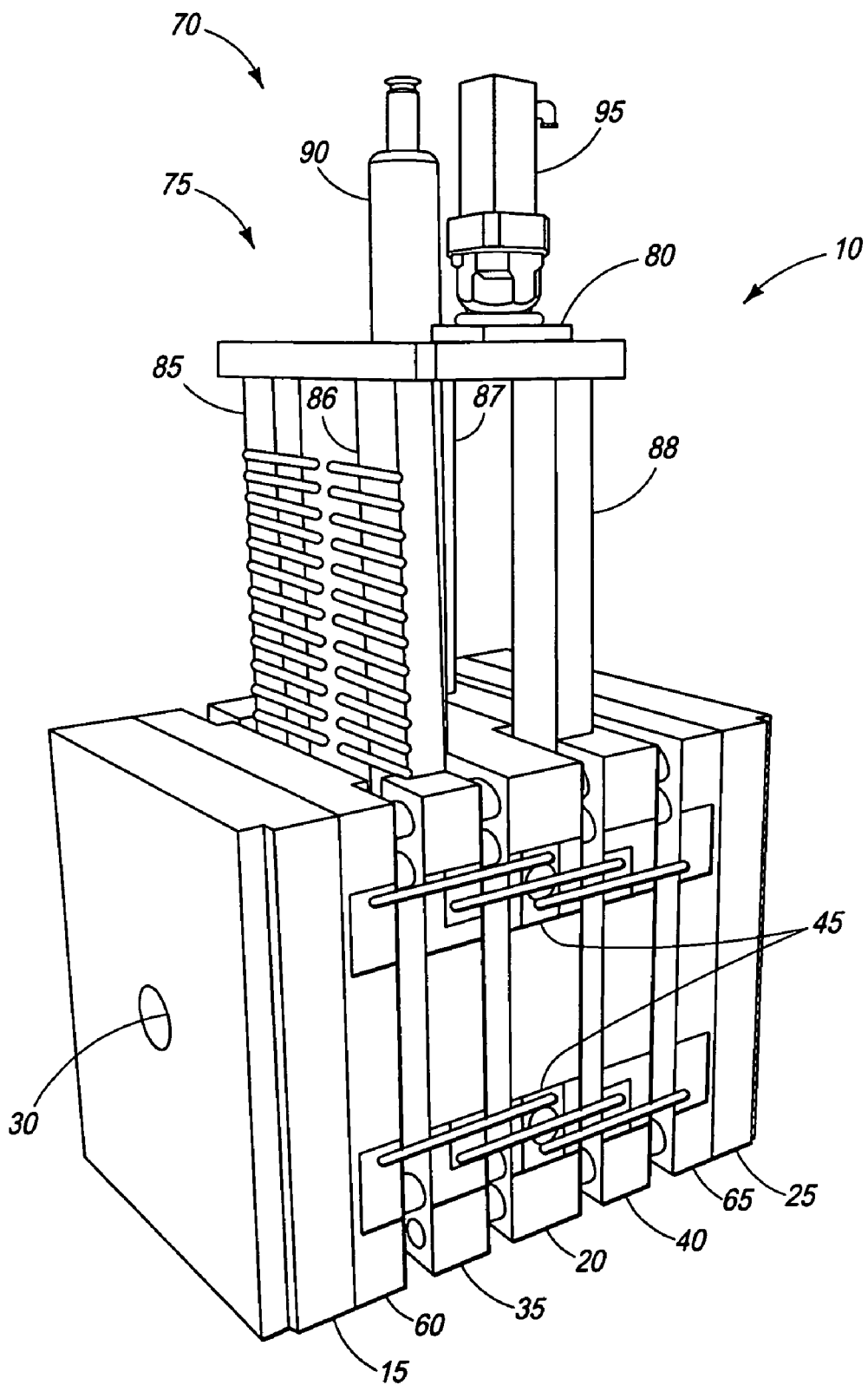

FIGS. 3-4 shows the mold assembly 10, with the carrier 75 beginning to move along the rail 90 from the closed position to the open position. The actuator 95 may trigger this movement, and the actuator 95 may move along with the carrier 75. As the carrier 75 moves along the rail 90 from the closed position to the open position, the mold members 85, 86, 87, 88 may withdraw from the guides 35, 40.

Figure 5:
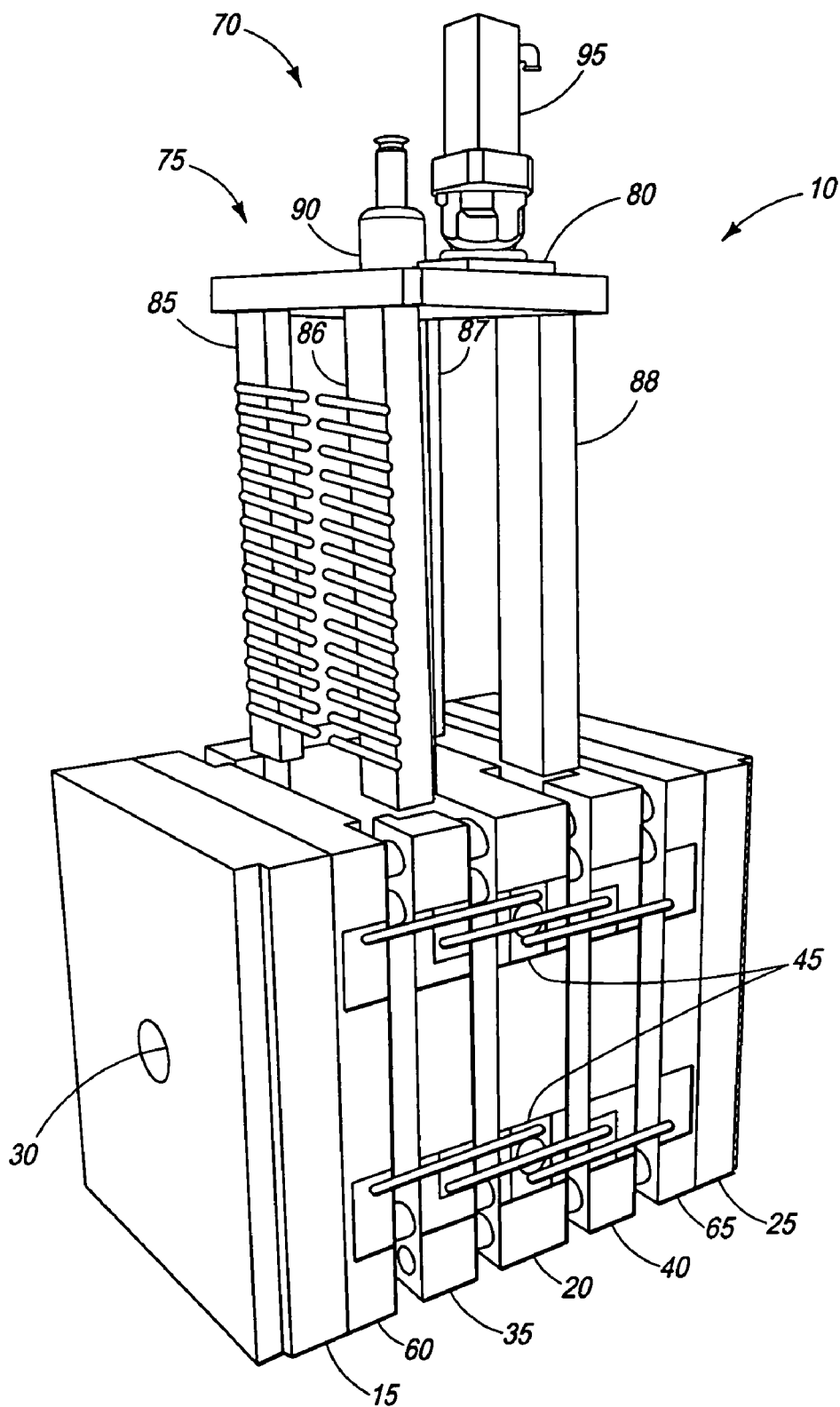
Figure 6:
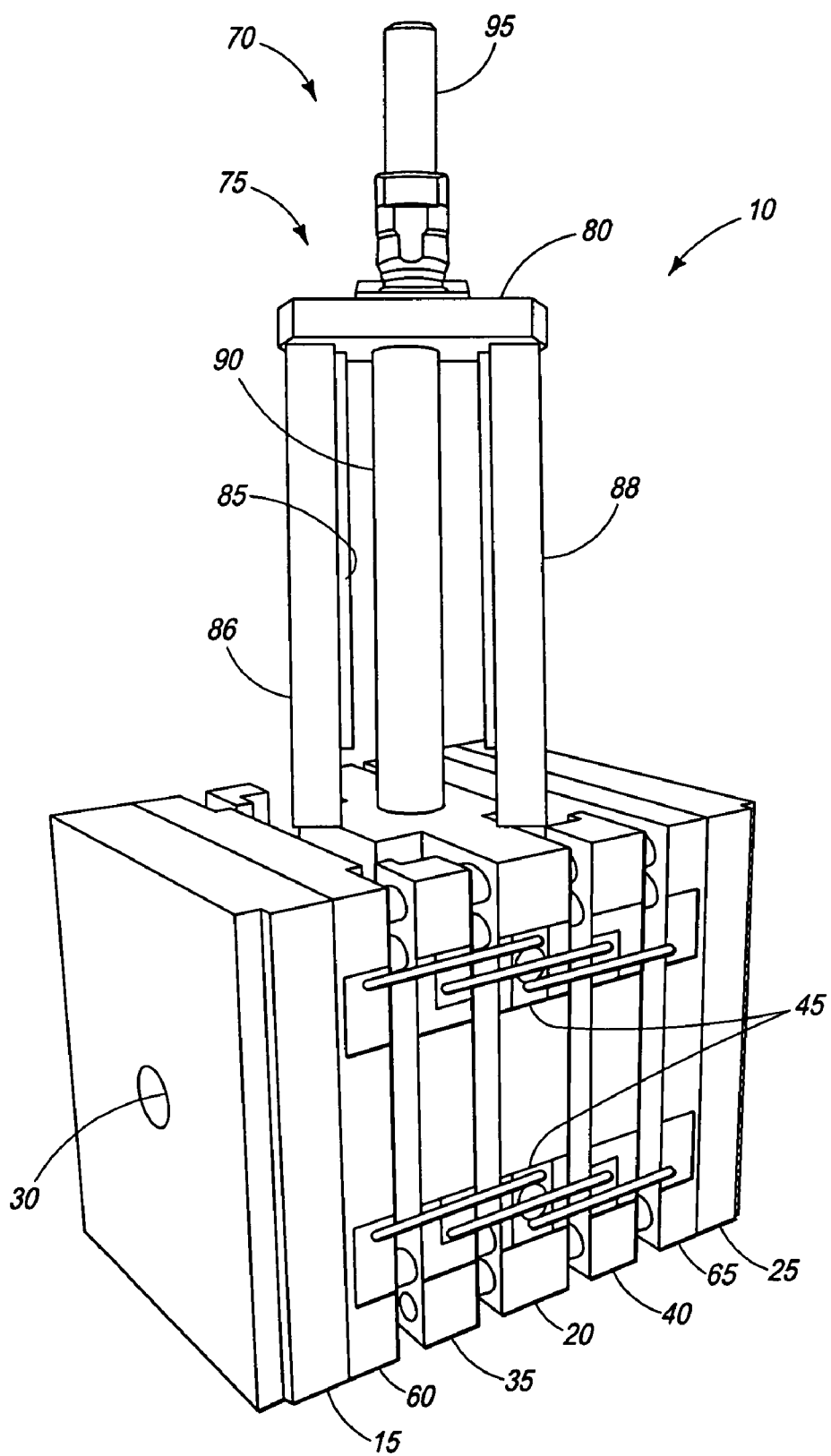

FIG. 5 shows the mold assembly 10, with the carrier 75 in the open position. In the open position, the mold members 85, 86, 87, 88 may be outside of the mold plates 15, 20, 25. Depending on what is being manufactured, the relevant parts may be ejected, prepared for molding (e.g., insert molding, over molding, in-mold decorating, in-mold labeling, etc.), prepared for additional cooling, prepared for in-mold assembly, or the like. Preparing the relevant parts for molding or additional cooling may involve rotating the carrier 75 about the rail 90. FIG. 6 shows the beginning of such rotation. The actuator 95 may trigger this rotation, and may rotate along with the carrier 75.

Figure 7:
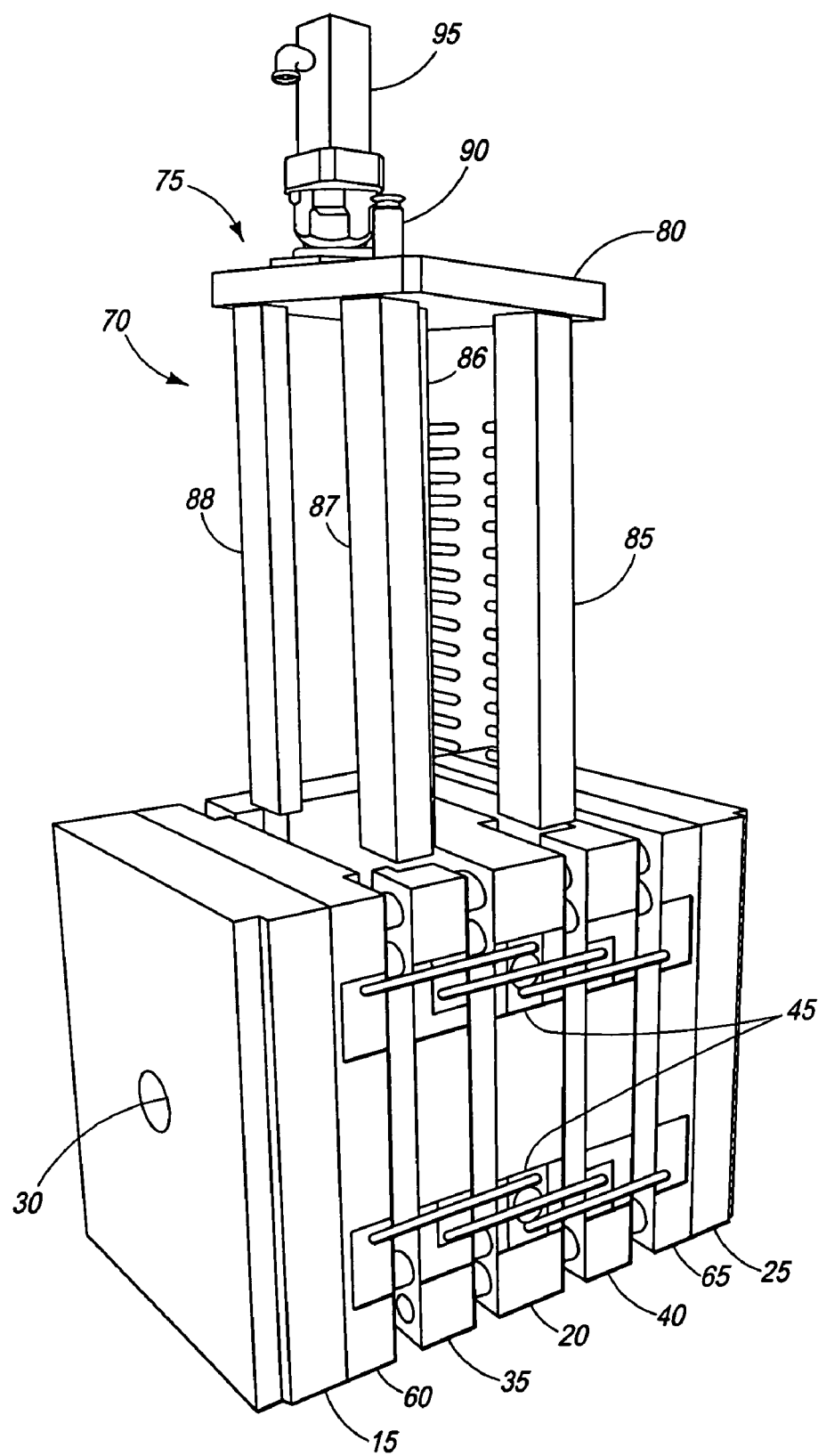

FIG. 7 shows the carrier 75 after having rotated until the carrier 75 is positioned for another molding operation. In the exemplary mold assembly 10 shown in FIGS. 1-6, the carrier 75 rotates 180°. In embodiments having a different number of processing stations, the carrier 75 may rotate through an angle that differs from 180°. In this position, mold members 87, 88 (which may as yet hold no relevant parts) may be aligned to be inserted into guides 35 between mold plate 15 and mold plate 20, and mold members 85, 86 (which may hold the relevant parts) may be aligned to be inserted into guides 40 between mold plate 20 and mold plate 25.

Figure 8:
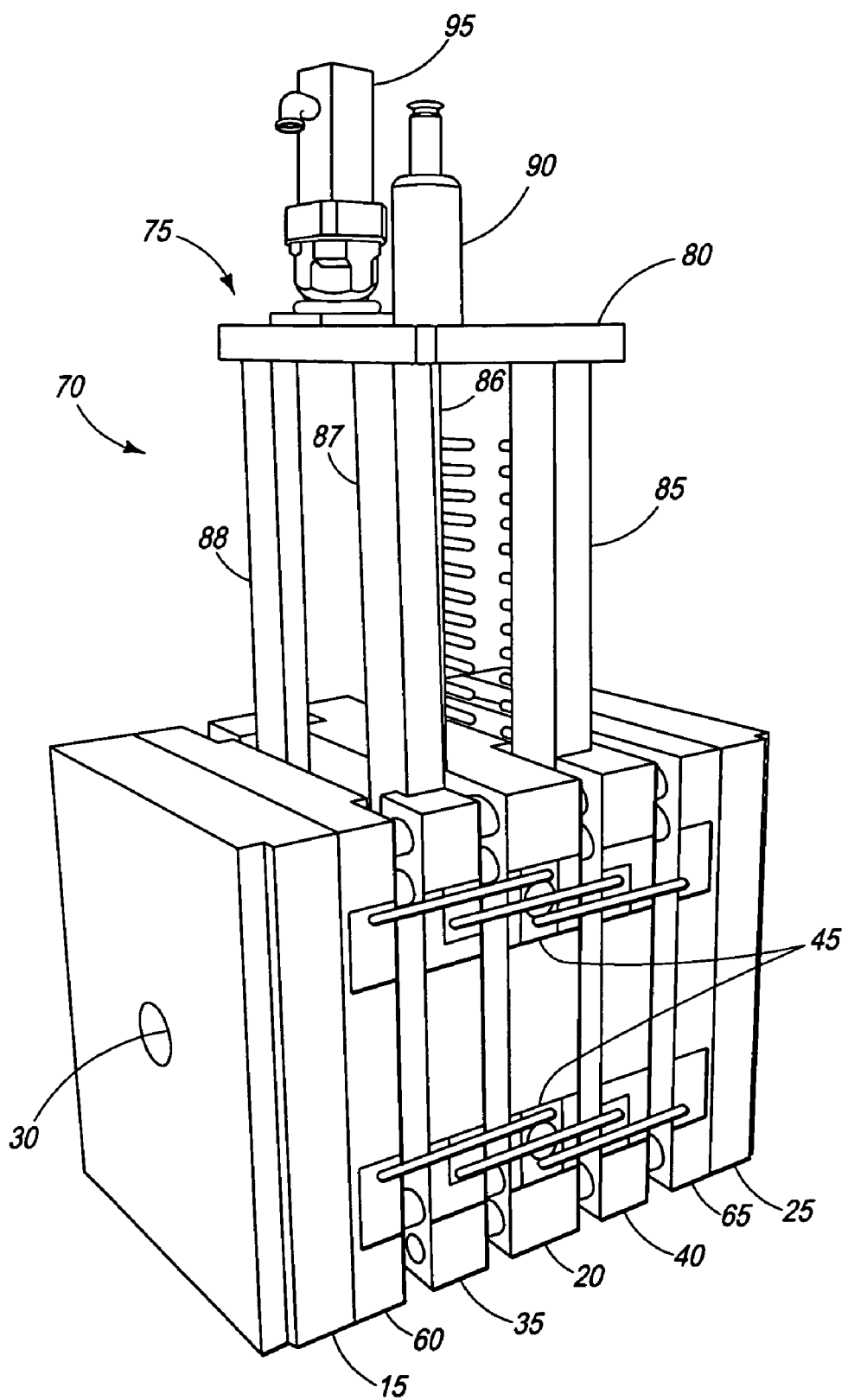

FIG. 8 shows the mold assembly 10, with the carrier 75 beginning to move along the rail 90 from the open position to the closed position. The actuator 95 may trigger this movement, and the actuator 95 may move along with the carrier 75. As the carrier 75 moves along the rail 90 from the open position to the closed position, mold members 85, 86 (full) may be received by guides 40 and introduced to the second processing station, and mold members 87, 88 (empty) may be received by guides 35 and introduced to the first processing station.

Figure 9:
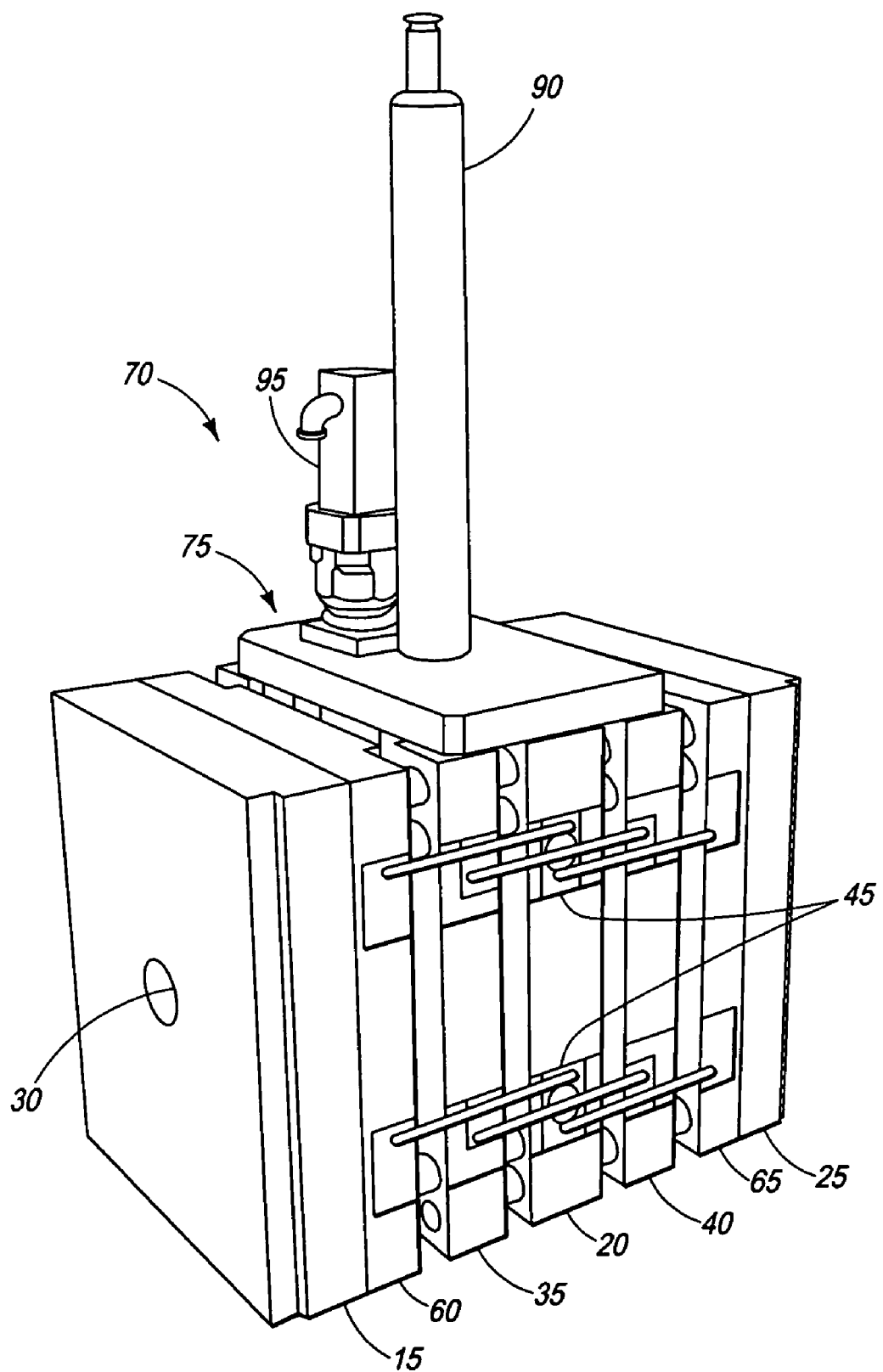
Figure 10:
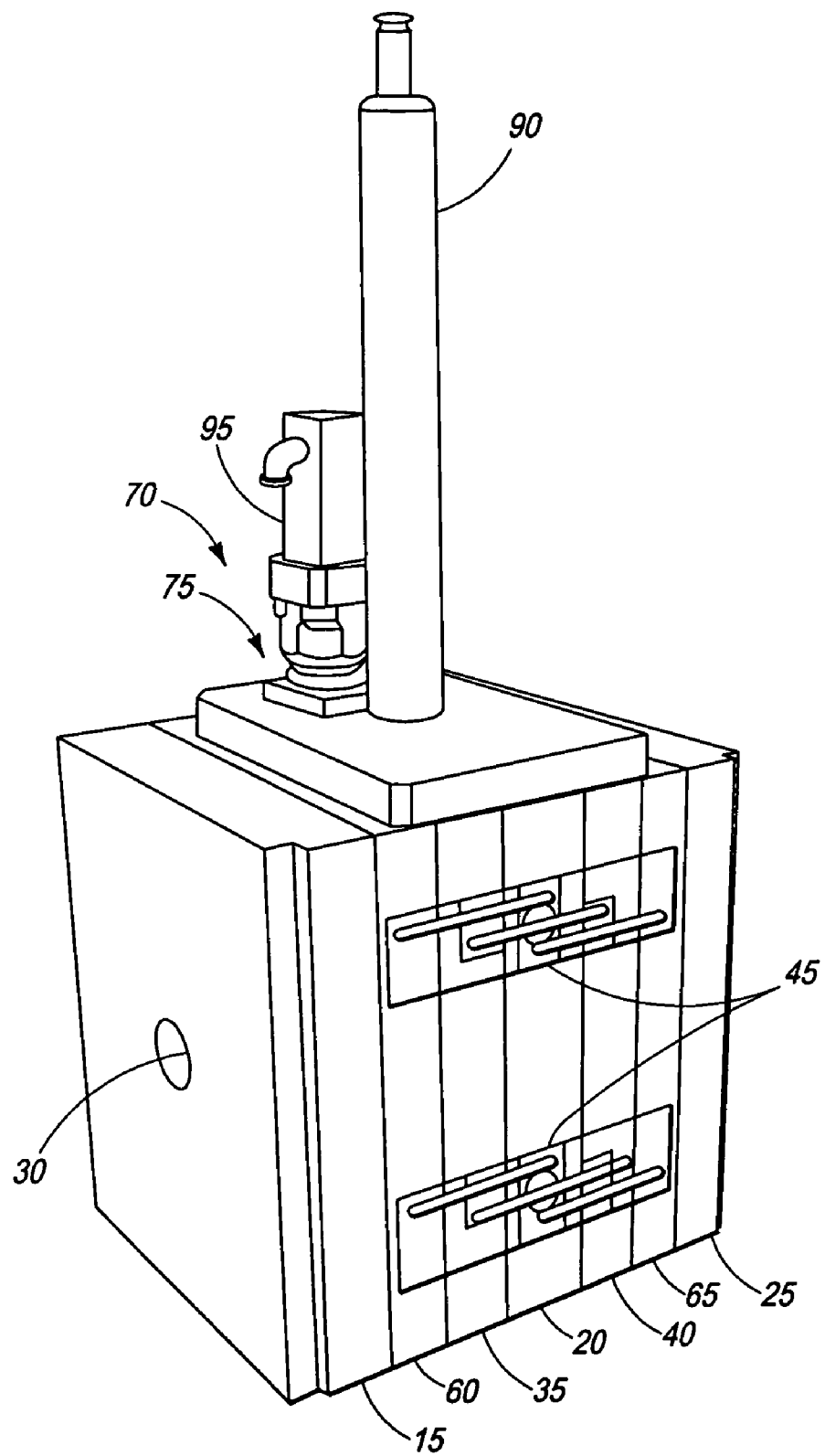

FIG. 9 shows the mold assembly 10, with the carrier 75 in the closed position. The harmonic linkage 45 may cause the guides 35, 40, and thus the mold members 85, 86, 87, 88 to move evenly toward mold plate 15, thereby pressing the mold plates 15, 20, 25 and the mold members 85, 86, 87, 88 together. FIG. 10 shows the mold assembly 10 in such a position. As with the first molding operation, during the second molding operation, a series of molded articles may be created or inserts may be placed at the first processing station. During the second molding operation, the relevant parts may be subject to further processing at the second processing station. In some applications, such relevant parts may be subject to molding (e.g., insert molding, over molding, etc.). Examples of such applications include toothbrushes, razor handles, syringe plungers, and other similar applications. In some applications, such relevant parts may be subject to additional cooling. Examples of such applications include plumbing components, medical connectors, cylindrical products that could benefit from additional cooling, and other similar applications. After processing is completed at both processing stations, the mold may be opened, the carrier 75 may be translated to the open position, the carrier 75 may be rotated, and the mold assembly 10 may be prepared for subsequent molding operations.

Finished molded articles may be ejected in a variety of ways. In some embodiments, finished molded articles may be ejected when the carrier 75 is in the open position. In some embodiments, finished molded articles may be ejected when the carrier 75 is in the closed position. In such embodiments, finished molded articles may be ejected while the mold closes. In such embodiments, finished molded articles may be ejected while the mold opens.

In some embodiments, the entire process of opening the mold, moving the carrier 75 from the closed position to the open position, rotating the carrier 75, moving the carrier 75 from the open position to the closed position, and closing the mold may take only 2-3 seconds. This speed may significantly increase output compared to other injection molding systems of similar size.

Figure 11:
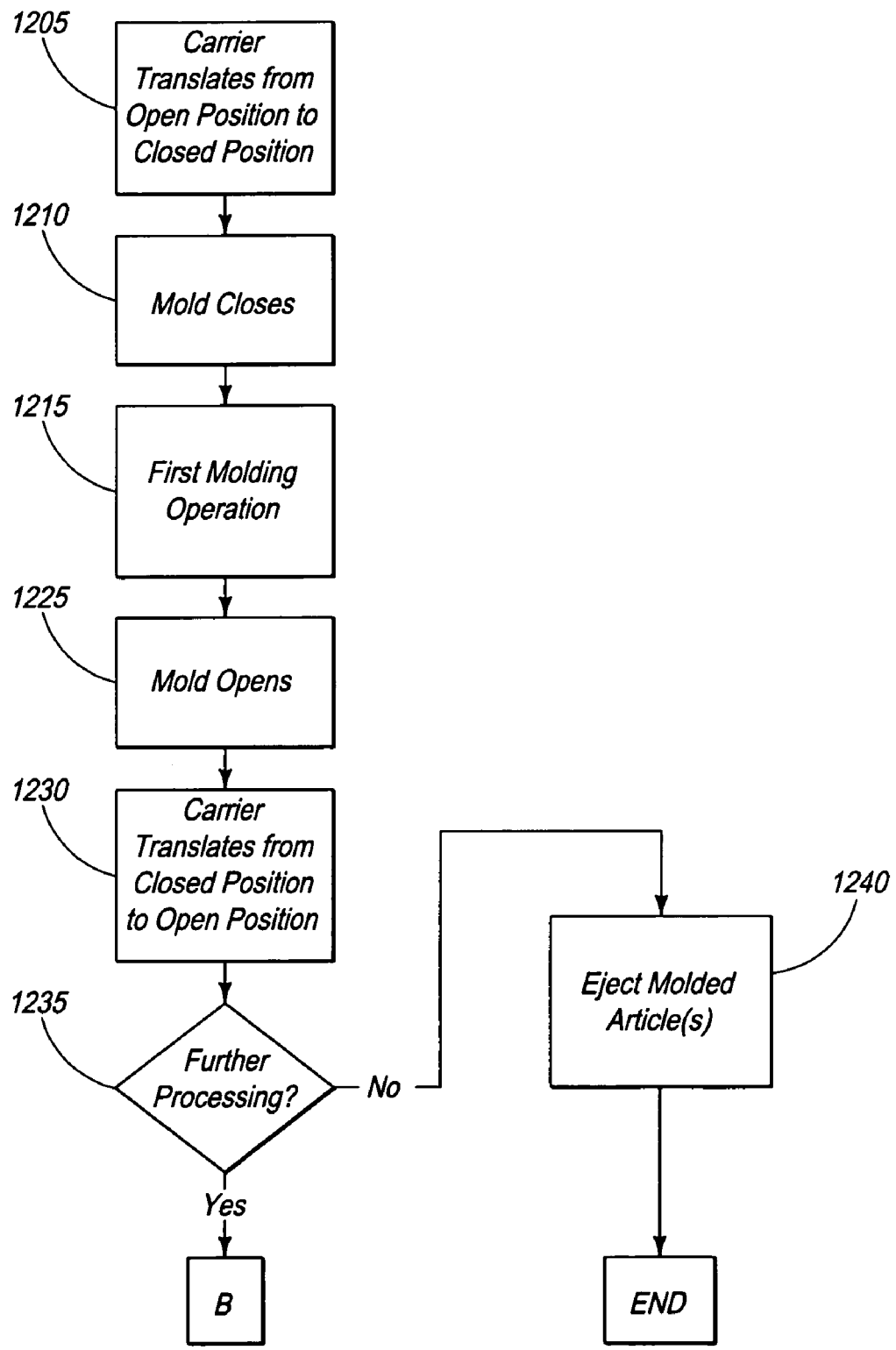
FIG. 11 shows a flowchart of a method for performing a first injection molding operation at a first processing station.

FIG. 11 illustrates an exemplary method for performing a first injection molding operation at a first processing station. To begin, a carrier may translate from an open position to a closed position (1205). The mold may close (1210), and a first molding operation may be performed (1215). In some embodiments, the first molding operation may involve molding a desired article. In some embodiments, the first molding operation may involve placing an insert into a mold component that is part of the mold members 85, 86, 87, 88, or that is held by the mold members 85, 86, 87, 88, for over-molding. The mold may open (1225), and the carrier may translate from the closed position back to the open position (1230), along with the relevant parts. A controller connected to the injection molding machine carrying out the method discussed in connection with FIG. 11 may determine whether the relevant parts require further processing (1235). If the controller determines that the relevant parts do not need further processing, the relevant parts may be ejected (1240), and the method may come to an end. If the controller determines that the relevant parts require further processing, the method may proceed to (B), illustrated in FIG. 12.

Figure 12:
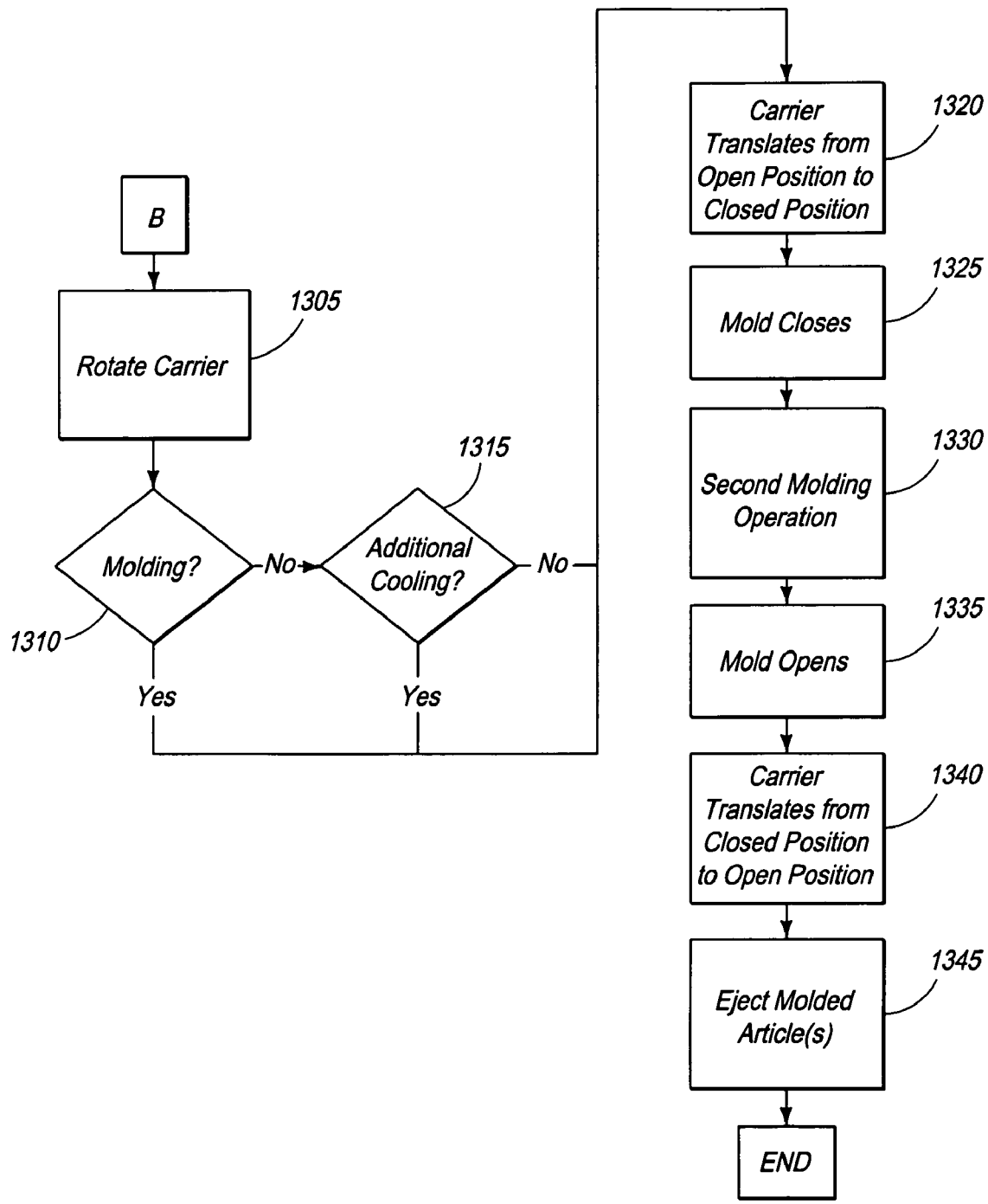
FIG. 12 shows a flowchart of a method for performing a second injection molding operation at a second processing station.

FIG. 12 illustrates an exemplary method for performing a second injection molding operation at a second processing station. The method of FIG. 12 picks up at (B), where the method of FIG. 11 left off. If the controller determines that the relevant parts require further processing, the carrier may be rotated (1305). The carrier may be rotated to a position that would allow the carrier to translate back into the closed position. The controller may determine what kind of additional processing of freshly molded article requires. The controller may determine whether the relevant parts require molding (1310). Molding may include all types of molded discussed herein and all other suitable types of molding. The controller may determine whether the relevant parts requires additional cooling (1315). The carrier may translate from the open position to the closed position (1320), and the mold may close (1325). A second injection molding operation may be performed at the second processing station (1330), depending on the assessment of the controller. After the second injection molding operation is completed, the mold may open (1335), and the carrier may translate from the closed position to the open position (1340). The completed molded article may be ejected (1345), and the method may come to an end.

The methods provided in FIGS. 11-12 are presented for purposes of illustration only. One skilled in the art will appreciate that other methods may be implemented in connection with the present invention. Moreover, the order of steps provided in the methods shown in FIGS. 11-12 is provided for purposes of illustration only. Any order that achieves the desired functionality may be implemented. Any of the functionality discussed anywhere in this disclosure may be implemented in either of the methods shown in FIGS. 11-12.

Certain embodiments of the rotary automatic transfer rail for injection molding are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A mold assembly, comprising:
    first, second and third mold plates positioned generally parallel to one another, at least one of the mold plates having a sprue hole; and
    an automatic transfer rail assembly coupled to one of the mold plates, the automatic transfer rail assembly including:

a rail extending generally parallel to the first, second, and third mold plates, and a carrier coupled to the rail, the carrier having first and second members and being translatable along the rail between (a) a first closed position in which the first member is positioned functionally between the first mold plate and the second mold plate and the second member is positioned functionally between the second mold plate and the third mold plate, and (b) an open position in which the first and second members are outside of the first, second, and third mold plates, wherein the mold assembly is configured to assist in performing a first injection molding operation between the first and second mold plates and a second injection molding operation between the second and third mold plates, and wherein the carrier is rotatable about the rail (a) to the first closed position, and (b) to a second closed position in which the first member is positioned functionally between the second mold plate and the third mold plate and the second member is positioned functionally between the first mold plate and the second mold plate.

2. The mold assembly of claim 1, wherein the second injection molding operation comprises cooling one or more previously molded articles.

3. The mold assembly of claim 1, wherein the second injection molding operation comprises molding.

4. The mold assembly of claim 1, wherein the second injection molding operation comprises receiving an insert to be molded over.

5. The mold assembly of claim 1, wherein the automatic transfer rail assembly further comprises a ball screw and ball spline combination to cause the carrier to translate and rotate.

6. The mold assembly of claim 1, wherein the first member holds a a mold component.

7. The mold assembly of claim 1, wherein the first member comprises a mold component.

8. The mold assembly of claim 1, further comprising a guide coupled to one of the mold plates, the guide being configured to receive the first member as the carrier translates from the open position to the closed position.

9. The mold assembly of claim 8, further comprising a linkage mechanism coupled to one of the mold plates, the linkage mechanism being configured to continually position the guide halfway between the first mold plate and the second mold plate.

10. A method for injection molding an article, the method comprising:

providing a mold assembly having (a) first, second, and third mold plates positioned generally parallel to one another, at least one of the mold plates having a sprue hole, and (b) an automatic transfer rail assembly coupled to one of the mold plates, the automatic transfer rail assembly including (i) a rail extending generally parallel to the first, second, and third mold plates, and (ii) a carrier coupled to the rail, the carrier having first and second members;

translating the carrier along the rail from a first open position in which the first and second members are outside of the mold plates to a first closed position in which the first member is positioned functionally between the first and second mold plates and the second member is positioned functionally between the second and third mold plates;

closing the mold assembly while the carrier is in the first closed position;

performing a first injection molding operation at a first processing station between the first and second mold plates;

opening the mold assembly; and translating the carrier along the rail from the first closed position to the first open position.

11. The method of claim 10, further comprising:

rotating the carrier about the rail from the first open position to a second open position in which the carrier is outside of the mold plates;

translating the carrier along the rail from the second open position to a second closed position in which the first member is positioned functionally between the second mold plate and the third mold plate and the second member is positioned functionally between the first and second mold plates;

closing the mold assembly;

performing the first injection molding operation at the first processing station;

performing a second injection molding operation at a second processing station between the second and third mold plates;

opening the mold assembly; and translating the carrier along the rail from the second closed position to the second open position.

12. The method of claim 11, further comprising rotating the carrier about the rail from the second open position to the first open position.

13. The method of claim 11, wherein the first injection molding operation comprises receiving an insert to be molded over and the second injection molding operation comprises molding over the insert.

14. The method of claim 11, wherein the second injection molding operation comprises processing one or more molded articles formed by the first injection molding operation.

15. The method of claim 11, wherein the second injection molding operation comprises cooling one or more molded articles formed by the first injection molding operation.

16. The method of claim 10, wherein the mold assembly further comprises a guide and the method further comprises receiving the first member with a guide as the carrier translates from the open position to the closed position.

17. The method of claim 10, further comprising continuously positioning the first member halfway between the first mold plate and the second mold plate as the mold assembly opens and as the mold assembly closes.

18. A mold assembly, comprising:

first, second, and third mold plates positioned generally parallel to one another, at least one of the mold plates having a sprue hole; and an automatic transfer rail assembly coupled to one of the mold plates, the automatic transfer rail assembly including:

a rail extending generally parallel to the first, second, and third mold plates, and a carrier coupled to the rail, the carrier (a) having first and second members, (b) being translatable along the rail between (i) a first closed position in which the first member is positioned functionally between the first mold plate and the second mold plate and the second member is positioned functionally between the second mold plate and the third mold plate, and (ii) an open position in which the first and second members are outside of the first, second, and third mold plates, and (c) being rotatable about the rail (i)

to the first closed position, and (ii) to a second closed position in which the first member is positioned functionally between the second mold plate and the third mold plate and the second member is positioned functionally between the first mold plate and the second mold plate.

* * * * *